Figure 1:
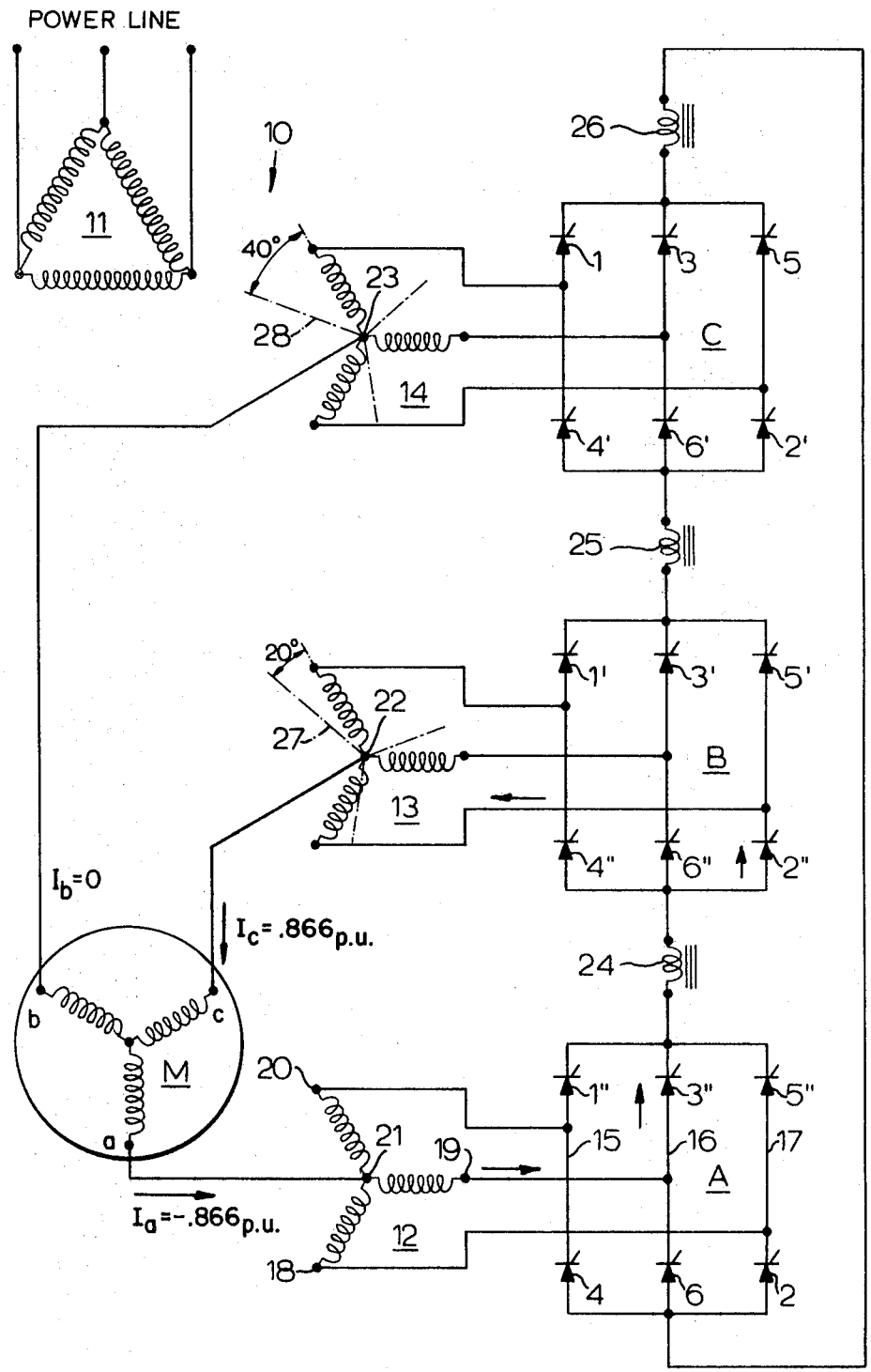

United States Patent

[11] 3,622,859

[72] Inventor  Dennis F. Williamson
                Media, Pa.
[21] Appl. No. 2,521
[22] Filed     Jan. 13, 1970
[45] Patented  Nov. 23, 1971
[73] Assignee  Canadian General Electric Limited
                Toronto, Canada

[54] RECTIFIER FREQUENCY CONVERTERS
     6 Claims, 2 Drawing Figs.
[52] U.S. Cl. .................................................. 321/7,
                                     321/9, 321/66, 321/69
[51] Int. Cl. ............................................... H02m 5/30
[50] Field of Search ..................................... 321/5, 60,
                                                      69, 7

[56]           References Cited
            UNITED STATES PATENTS
3,302,093   1/1967   Yarrow ........................ 321/69 X 3,447,061   5/1969   Russell et al. ................. 321/5
3,493,838   2/1970   Gyugyi et al. ................. 321/69 X Primary Examiner—William M. Shoop, Jr.
Attorneys—J. Wesley Haubner, Albert S. Richardson, Jr.,
  Frank L. Neuhauser, Oscar B. Waddell and Joseph B.
  Forman ABSTRACT: A frequency converter according to this invention comprises a transformer having three wye connected three-phase secondaries connected to a delta configuration of controlled rectifier bridges, and means for firing the rectifiers so as to obtain an adjustable frequency output from the bridges. Each bridge has three parallel legs with at least two rectifiers per leg connected in series anode to cathode. The three output terminals of each transformer secondary are connected to the three legs respectively of a different bridge between the rectifiers, and the adjustable frequency output is taken from the three wye points of the transformer secondaries. This places the impedances of the transformer secondaries between the rectifiers and the load.

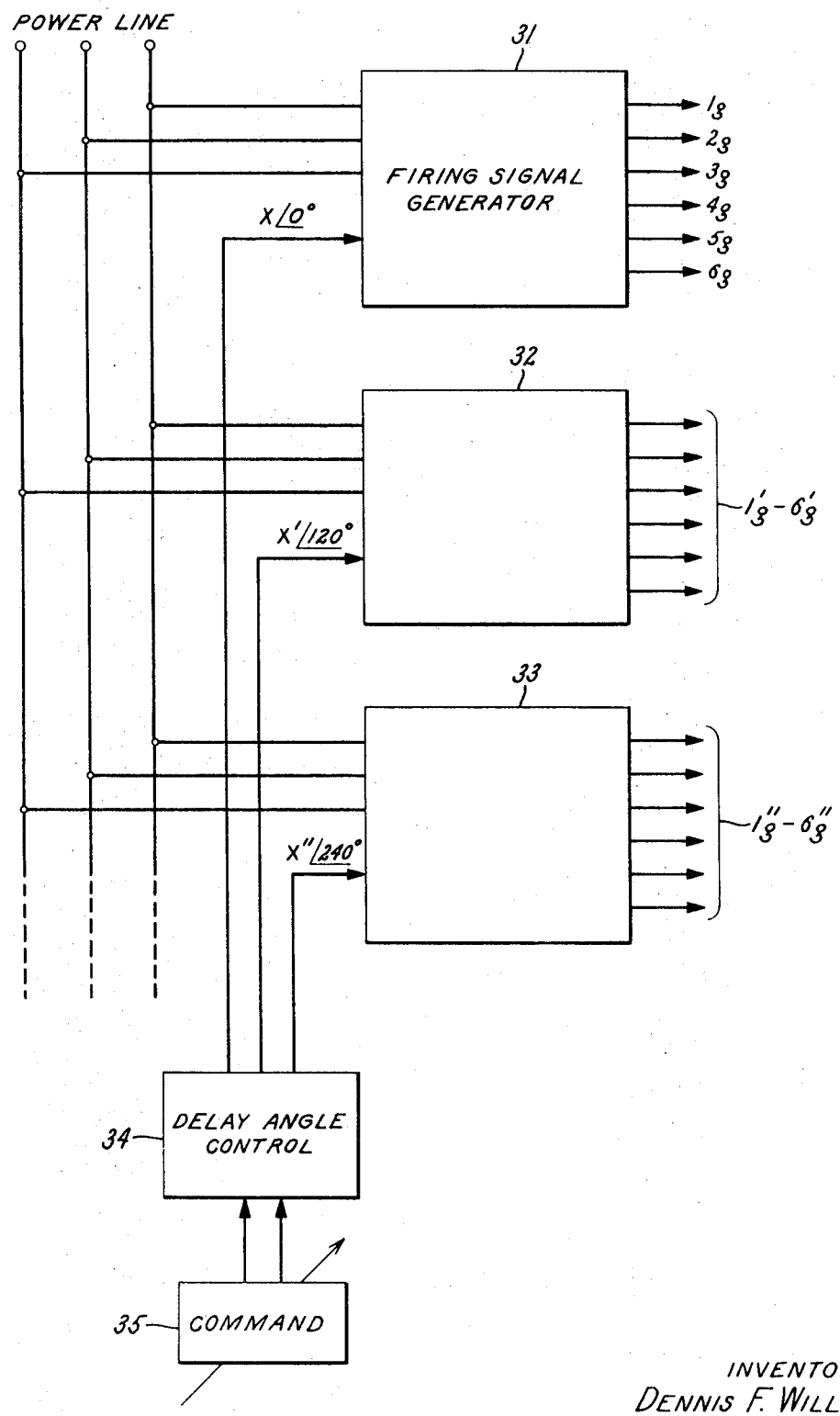

RECTIFIER FREQUENCY CONVERTERS

This invention relates to multiphase frequency converters using controlled rectifiers.

Frequency converters using controlled rectifiers, in particular thyristors, are well known for multiphase alternating-current applications where an adjustable frequency is wanted. This type of converter is now being used for controlling the speed of induction or synchronous motors by changing the frequency of the alternating current supplied to the motor. A wide range of speed control is usually wanted in both forward and reverse rotation of the motor as well as electrodynamic braking in both rotations. These requirements have led to complicated circuits using a large number of controlled rectifiers.

Simplified circuits have been developed. One of the simplest is a delta configuration of three full-wave bridges in which each bridge has three parallel legs with at least two controlled rectifiers per leg connected in series anode to cathode. Three wye-connected secondaries of a three-phase transformer provide a standard frequency input to the bridges. Each transformer secondary is connected to a different bridge to the three legs respectively thereof between the controlled rectifiers. An adjustable frequency output is taken from between the bridges at the corners of the delta. Firing of the rectifiers is controlled so that conduction of the rectifiers produces an output frequency that can be adjusted within certain limits. A major drawback of this circuit is that some of the lower frequency odd harmonics, which are usually present, may cause unwanted currents to circulate in the circuit. To decrease these circulating currents to acceptable levels, reactors are usually placed in the delta configuration of bridges. Since the output is taken directly from the bridges, there is little or no impedance between the rectifiers and the load.

A frequency converter according to this invention comprises a transformer having three wye-connected three-phase secondaries connected to a delta configuration of controlled rectifier bridges, and means for firing the rectifiers so as to obtain an adjustable frequency output from the bridges. Each bridge has three parallel legs with at least two rectifiers per leg connected in series anode to cathode. The three output terminals of each transformer secondary are connected to the three legs respectively of a different bridge between the rectifiers, and the adjustable frequency output is taken from the three wye points of the transformer secondaries. This places the impedances of the transformer secondaries between the rectifiers and the load.

A specific embodiment of the invention will now be described with reference to the accompanying drawings in which FIG. 1 is a schematic circuit diagram of the invention and FIG. 2 is a functional block diagram of typical control circuitry that can be used for firing the controlled rectifiers shown in FIG. 1.

In FIG. 1 of the drawing there is shown a three-phase transformer 10 having a delta connected primary 11 energized from a source of standard frequency alternating current, i.e., a 60-cycle power supply, and three wye-connected secondaries 12, 13 and 14 connected to a delta configuration of rectifier bridges A, B and C. Bridges A, B and C are alike; each one is a conventional full-wave bridge for use in a three-phase circuit. Each bridge has three parallel legs 15, 16 and 17 with two controlled rectifiers per leg connected in series anode to cathode, preferably thyristors. The thyristors are numbered in their firing order, numbers 1 to 6 being first, numbers 1' to 6' next, and finally numbers 1" to 6". Each transformer secondary has its output terminals 18, 19 and 20 connected to the three legs 15, 16 and 17 respectively of a different bridge between the two thyristors in the leg.

The three wye points 21, 22 and 23 of the transformer secondaries constitute the output terminals of the circuit, and are shown connected to a three-phase load M which may be the primary winding of an induction or synchronous motor. The output from terminals 21, 22 and 23 is a three-phase output having a frequency which can be adjusted by the firing of the thyristors. When the load is a motor of which the speed is governed by the frequency, as the load usually is, the frequency will be made adjustable over a wide range. In those cases where the speed of the motor must be controlled for both directions of rotation, the frequency may range from zero to well above the standard 60 cycles for both forward and reverse motor rotations. Because reversible operation usually calls for electrodynamic braking by the motor, it is desirable that the converter be capable of feeding the electrical energy generated by the motor back into the powerline. Since the firing controls necessary for this kind of motor operation form no particular part of the invention, they will be mentioned only very briefly later on.

Taking the adjustable frequency output at the three wye points 21, 22 and 23 of the transformer secondaries does not affect the circulating currents of the harmonic origin. Therefore, in some instances it may be advantageous to place reactors in the delta between the rectifier bridges in series therewith as illustrated at 24, 25 and 26 to improve the circuit for suppressing harmonics. For even further improvements, each reactor may have a capacitor connected across it and the circuit tuned to the sixth harmonic of the input frequency. By connecting the to the wye points of the secondaries, impedance of the secondaries is placed between the rectifiers and the load. Therefore, in the event of a fault in the load or the line leading from the converter to the load, the impedance of the secondaries will limit the fault current passed by the rectifiers before the protective devices operate to isolate the fault. In some applications, this could be a deciding advantage over the converter where the load is taken at the corners of the delta configuration of bridges.

A means for firing the controlled rectifiers in the bridges so as to obtain an adjustable frequency alternating-current output from the configuration of bridges is shown by way of example in FIG. 2. This means consists essentially of three duplicate firing signal generators 31, 32 and 33 which in their quiescent state produce a series of pulses of sufficient energy to render the controlled rectifiers conductive, i.e., generator 31 produces a train of pulses $1g$ to $6g$ for cyclically firing in numerical order the thyristors 1 to 6 shown in FIG. 1. Such generators are conventional and well known in the art. Each operates in synchronism with the three-phase, 60-cycle voltage on the power line to produce a train of six pulses per cycle at a delay angle determined by the value of an externally supplied control signal. In FIG. 2 the control signal for the firing signal generator 31 is designated "$x$," *and this generator is suitably designed and arranged so that when the magnitude of x is zero, its pulses will sequentially fire the thyristors 1 through 6 at a phase delay angle of 90° from the free conduction point of the applied voltage waveform. It is known that a firing delay of 90° produces a net output from a three-phase rectifier bridge of zero DC volts and a sixth harmonic of the input frequency, which harmonic results in a 360-pulse unidirectional current flow in the circuit. If the magnitude of the control signal $x$ is progressively increased and decreased with alternately positive and negative polarity, the firing delay is modulated about the 90° point and a modulated output about zero voltage will occur. Full modulation consists of periodically advancing the firing delay to 0° and retarding it to 180°. The output frequency will be seen to be dependent on the periodicity of the modulation. Partial modulation, such as advancing the firing to 60° and retarding to 120°, produces a reduced voltage output. The gate pulses are related to the anode-to-cathode voltage of the power thyristors, and limits are placed at the 0° and the 180° retard positions. Furthermore, an adjustable stop is provided around 150° retard to prevent inverter shootthrough.

Persons skilled in the art will understand that the above-described modulation of the firing angle is obtained by supplying the firing signal generators 31, 32, and 33 with bipolarity control signals $x$, $x'$, and $x''$ of variable frequency and amplitude. Except for being phase displaced from one another by one-third cycle (output frequency basis), the control signals $x$, $x'$, and $x''$ are substantially identical to each other. In FIG. 2 such signals are produced by a delay angle control block 34 which is suitably designed and arranged to produce three-phase alternating output signals whose frequency, phase rotation, and ratio of amplitude to frequency can be preset or programmed as desired by associated command means 35. The frequency and phase rotation of the voltages which my converter applies to the windings of the motor M (FIG. 1) will match these parameters of the control signals $x$, $x'$, and $x''$, and the voltage magnitude will depend on the amplitude of the signals.

In FIG. 1 the arrows depict load currents flowing in the windings of motor M at the moment of time in an output voltage cycle when forward current in phase $c$ has just attained a magnitude equal to that of the reverse current in phase $a$. This particular moment marks the end of an interval of load current conduction by the single-primed group of thyristors and the beginning of conduction by the unprimed group. In the latter group the thyristors 3 and 4 are next fired, and load current commences in the reverse direction in phase $b$ of the motor windings. Concurrently the load current being carried by the double-primed group will be commutated from thyristor 2'' to thyristor 4''. Successive commutations proceed in a cyclic manner in both groups for a 120° interval (output frequency basis), whereupon load current conduction will cease in the double-primed group and begin in the single-primed group of thyristors.

There may be instances due to line or load conditions where the circulating currents in the converter circuit described above are too high for particular converter applications. In such cases the voltages applied to the rectifier bridges may be displaced in phase in the way described in the applicant's copending U.S. application, Ser. No. 829,478 filed on June 2, 1969 (now U.S. Pat. No. 3,539,901). This may be done either with or without the use of reactors such as 24, 25 and 26 in the delta bridge configuration. Referring again to the drawing, the voltages of transformer secondaries 13 and 14 are displaced 20 and 40 electrical degrees respectively in the same phase sense from the voltage of secondary 12. This is indicated in secondary 13 by the phantom lines 27 which are rotated 20 degrees counterclockwise with respect to the secondaries, and in secondary 14 by the phantom lines 28 which are rotated 40 degrees counterclockwise with respect to the secondaries. This means that the voltage of secondary 13 is displaced 20° in phase from the voltage of secondary 12, and that the voltage of secondary 14 is displaced a further 20 ° in the same phase sense. Hence the voltages applied to the bridges A, B and C are a progression of three-phase voltages 20 electrical degrees out of step. The means employed for displacing the voltages of the three secondaries is well known in the transformer art and needs no further comment.

If the voltages that secondaries 12, 13 and 14 apply to bridges A, B and C are too high for the individual thyristors 1 to 6, each may be replaced by two or more in series as required for the particular voltage. This is well known in the art.

The embodiments of the invention in which an exclusive property or privilege is claimed are defined as follows:

1. A rectifier frequency converter for changing a relatively constant three-phase AC frequency to an adjustable three-phase AC frequency, said converter comprising three, three-phase wye connected transformer secondaries, each having three output terminals and a neutral point; three full-wave rectifier bridges, each bridge having three parallel legs with at least two controlled rectifiers in each leg connected in series anode to cathode; three conductors for each transformer secondary, said conductors connecting a different one of said secondaries to a different one of said bridges, and the three conductors from each secondary connecting the respective output terminals of the secondary to the three legs respectively of the bridge between said rectifiers; conducting means connecting the three bridges in a delta configuration; a terminal on each one of said neutral points for connecting the neutral points of the three transformer secondaries to a three-phase load; and means for firing said controlled rectifiers so that conduction thereof changes the frequency of the current from the transformer secondaries from a relatively constant value to a three-phase frequency at the load varied by the firing means.

2. The frequency converter of claim 1 wherein said controlled rectifiers are thyristors.

3. The frequency converter of claim 1 wherein each one of said conducting means includes series inductive reactance.

4. The frequency converter of claim 1 wherein each one of said conducting means includes series inductive reactance and capacitance in parallel with the reactance.

5. The frequency converter of claim 1 wherein said load is a motor of which the speed is proportional to frequency.

6. The frequency converter of claim 1 wherein said three secondaries are part of a single three-phase transformer having a common core and a primary, said secondaries being wound on the core and interconnected in such a way that the voltages of the second and third secondaries are displaced 20° and 40° respectively in the same phase sense from the voltage of the first secondary.

* * * * *